May 2, 1967
R. M. VIGGARS
3,316,884
FEEDING DEVICE
Filed Oct. 20, 1965
2 Sheets-Sheet 1
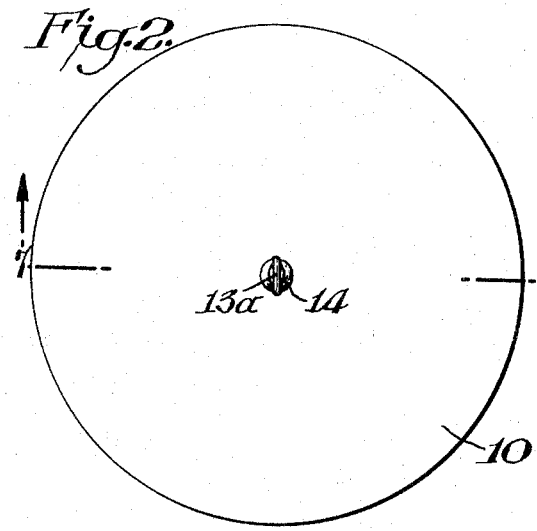
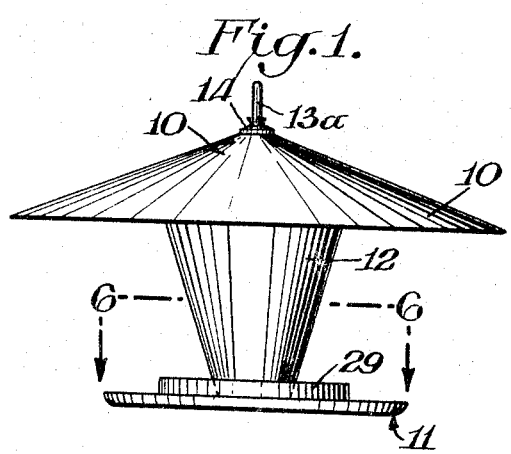
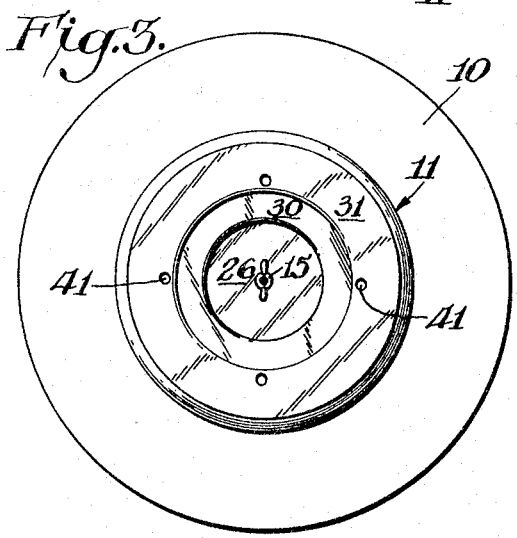
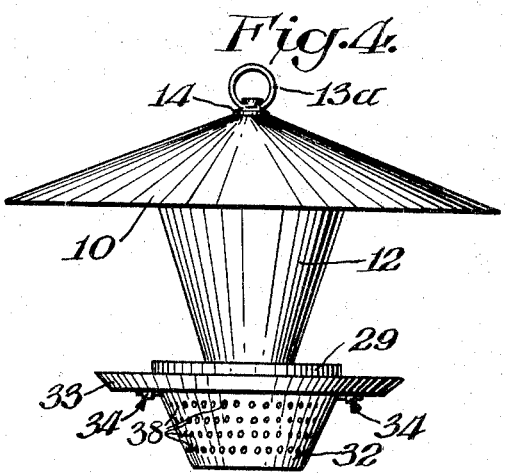
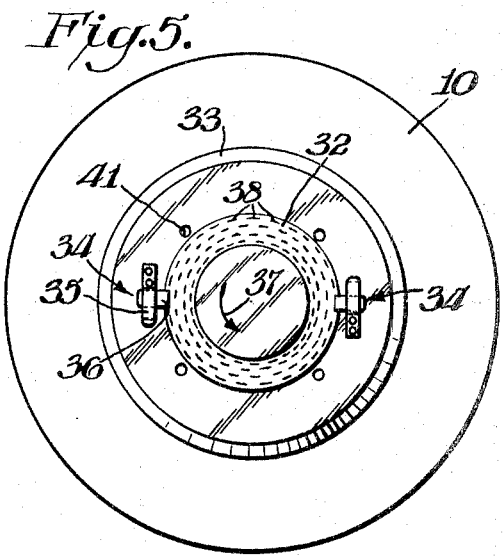
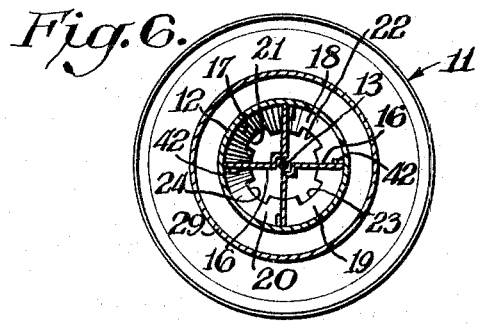
INVENTOR
Richard M. Viggars
BY C. W. Mortenson
ATTORNEY May 2, 1967 R. M. VIGGARS 3,316,884
FEEDING DEVICE
Filed Oct. 20, 1965 2 Sheets-Sheet 2
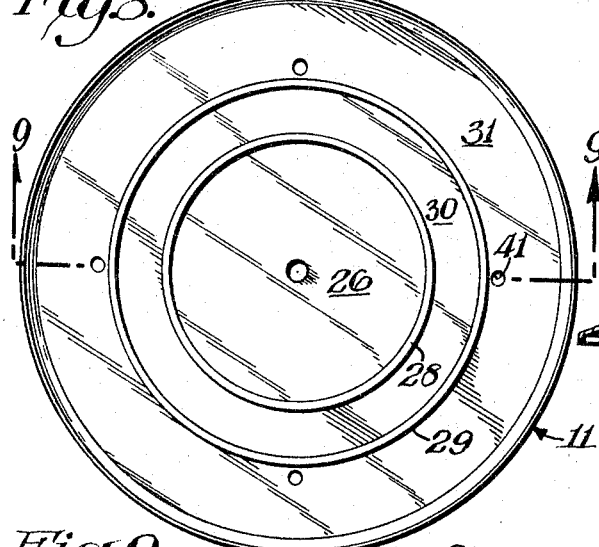
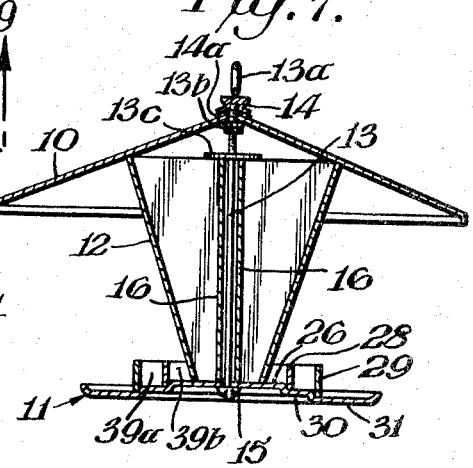
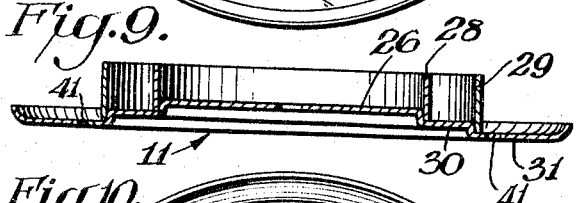
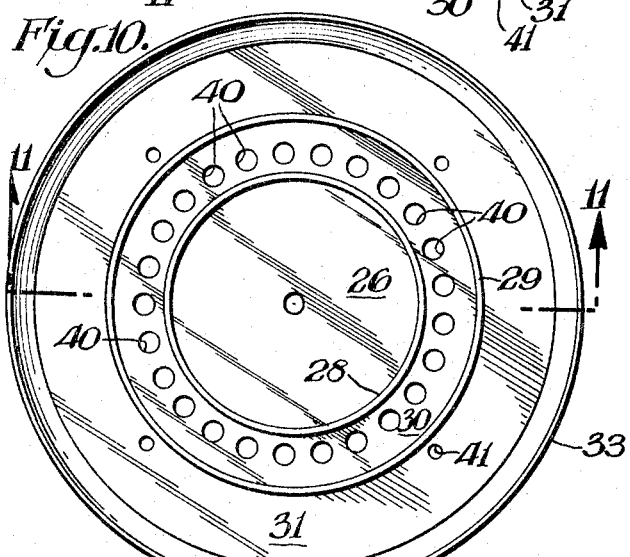
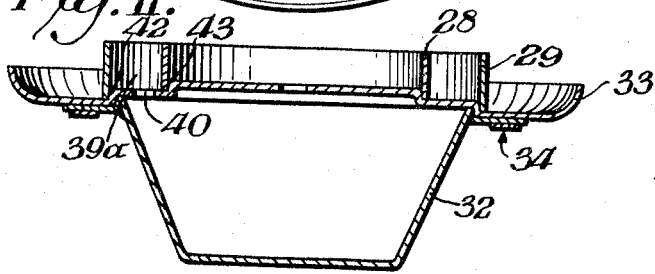
INVENTOR
Richard M. Viggars
BY C. H. Mortenson
ATTORNEY

United States Patent Office 3,316,884
Patented May 2, 1967

3,316,884
FEEDING DEVICE
Richard M. Viggars, Snuff Mill Road, Greenville,
Wilmington, Del. 19807
Filed Oct. 20, 1965, Ser. No. 498,555
19 Claims. (Cl. 119—52)

This invention relates to a bird feeder. More particularly, it relates to a device for feeding a variety of granulated materials in an efficient manner to birds, as desired.

There have been described in the prior art a large number of bird feeders of various kinds. While certain advantages are offered by the prior art feeders, there is need for a device which is easily assembled, being of simple design, and which allows different types of seed to be made available simultaneously and which affords feeding under conditions which minimize waste of seed and which affords protection of the seed from the weather.

Accordingly, an objective of this invention is the provision of an integral bird feeder which is readily assembled and disassembled. A further aim is providing a feeder which has various separate compartments to allow the feeding of different seeds at the same time. A still further aim is the provision of a feeder in which the feed is fully protected from the wind, rain and snow, and which may be equipped with feed-saving devices to reduce waste. Another purpose is the provision of a bird feeder which is light in weight and easily cleaned. These and other objectives will be seen hereinafter.

The purposes of this invention are accomplished by the provision of a feeder that has a top, a centrally disposed chamber and a bottom pan or tray that has extensions that go beyond the bottom edge of the central chamber and that is equipped to hold in confined areas seeds that are contained in the chamber and that fall on certain surfaces on the bottom as the birds feed. The centrally disposed chamber is preferably a hollow, truncated cone with its large diameter uppermost and with the majority of its bottom edges in contact with the top surface of the said bottom pan of the device. Inside the centrally disposed chamber is a plurality of separate compartments each of which contains a given type of bird seed and each of which feeds that particular type to the bottom pan of the device, each at a given location. The various elements are held together by a single thumb screw which co-acts with a rod that passes through the center of the device and which has an appropriate retaining member bearing against the top or the bottom, as desired, so that when the thumb screw is tightened up on the flattened post of the rod, it pushes the elements together and holds them together as a unit. In the bottom pan are retaining members that prevent the seed from being scattered to the ground. This invention will be further understood by reference to the description below and to the drawings, all of which is given for illustrative purposes only and are not limitative.

In the drawings:

FIGURE 1 is a front elevation of a bird feeder of this invention in assembled form;

FIGURE 2 is a top plan view of the device shown in FIGURE 1;

FIGURE 3 is a bottom plan of the device shown in FIGURE 1;

FIGURE 4 is a front elevation of a device similar to that shown in FIGURE 1 but fitted with a ventilated seed catcher of this invention;

FIGURE 5 is a bottom plan view of the device shown in FIGURE 4;

FIGURE 6 is a view taken on line 6—6 of FIGURE 1 showing the compartments within the central member;

FIGURE 7 is a view taken on line 7—7 of FIGURE 2 showing the device of this invention in cross-section;

FIGURE 8 is a top plan view of the base plate or bottom pan;

FIGURE 9 is taken on line 9—9 of FIGURE 8, showing the base plate of this invention in cross-section;

FIGURE 10 is a top plan of the base plate which is used in the modification shown in FIGURE 4 involving the seed catcher; and FIGURE 11 is taken on line 11—11 of FIGURE 10.

As can be seen in FIGURE 1 the bird feeder of this invention comprises a top 10 which is a flattened cone-shaped top that acts as a roof extending out beyond the outer edges of the bottom 11 which acts as a tray. The outer edge of top 10 is preferably crimped downwardly, as shown in FIGURE 7, for example, to form a vertical overhang, if desired, for the rim so formed makes the device less accessible to squirrels and the like and the down curve also serves to stiffen and strengthen the roof. In between the top 10 and the bottom 11 is the central member 12 which is a tapered, vertically disposed hollow member that acts as a storage chamber for the seed. Preferably, storage chamber 12 is transparent being made of a transparent plastic such as an acrylic resin. This allows one to see easily how much and where a given feed is contained in the device. Running through the entire device is a rod 13 which is adapted to receive basket nut 14 at the top which nut bears loop 13a which has a wing nut 15 at the bottom. Under basket nut 14 is a washer 14a which is pressed between the top of roof 10 and the underneath parts of nut 14. The resultant spreading of the washer, which is of a rubber or plastic nature, serves to seal the openings around rod 13 at the top and this makes chamber 12 water-tight and also serves to absorb abrasion between the bottom of basket nut 14 and the top surface of roof 10. On rod 13 directly under the apex of roof 10 are lock nuts or disks 13b which are adjustably fixed by threading to rod 13. When one tightens basket nut 14 he pushes roof 10 downwardly against members 13b. This tends to flatten roof 10 and makes the underneath sides contacting the top edges of chamber 10 bear down even more on those edges thereby making the chamber more water tight. The basket nut 14 and wing nut 15 are contained on rod 13 by threads (not shown). Tightening up on screw 14 will, of course, cause it to press against the top 10 and hold the elements together, there being a retaining member 15 on the underneath of bottom 11 shown in FIGURES 3 and 7.

Tightening of wing nut 15 presses base plate 11 upwardly and this in turn presses the storage chamber 12 upwardly against the partitions 16. This is resisted by partition disk 13c fixed to rod 13. Thus, if roof 10 is removed, all the remaining parts are still held together. In fact, the remaining assembly can be readily picked up and moved gripping disk 13c as a handle. The double tightening means using disk 13c and element 13b holds all of the remaining elements very tightly in place. The top plan shown in FIGURE 2 depicts the roof 10 as a generally circular member. While other shapes and sizes may be used, it is preferred to use the circular arrangement.

As can be seen in FIGURE 6, central member 12 contains the partition walls 16. There are four of these, and they are so arranged that they form four compartments 17, 18, 19 and 20. All of the walls 16 may be integral or separate or two may be joined as a pair as shown in FIGURE 6. Also shown there the walls of the central element 12 taper downwardly and in the bottom edges there are notches 21, 22, 23 and 24, one for each of the said compartments. Thus, the bottom edge of the central compartment 12 does not rest in a continuous fashion on the upper surface of bottom 11. There is a gap at each place where a notch 21, 22, 23 or 24 occurs, but adjoining each gap is a wall section which does go down to and is in contact with the top surface of bottom 11 when the device is assembled. It will be further appreciated that the partitioning walls 16 contact the inside walls of the central member 12 throughout the height of the central member 12. That is, the outermost edges of partition walls 16 will have the same slope and angle as the outside walls of 12. Thus, each feed that is contained in a given compartment is kept separated from the feed in another compartment. Further, as can be seen in FIGURE 6, the partitioning walls come together in the center leaving a gap that affords a passageway for the rod 13. Generally, the clearance between the rod 13 and the sections of divider walls 16 that come together at the center is absent, and the FIGURE 6 shows a clearance primarily for clarity. As explained above, the partition disk can be made to act as the member restraining movement of partition walls 16. If desired, these walls can be made to press up against rod 13 at their innermost edges and the walls can be held in place by this pressure. If desired, a positive locking means may be used which comprises rivets or blocks 42 which abut the walls 16 preventing their movement to the right or left within chamber 12. Another way of holding walls 16 pressed against the inner walls of chamber 12 is to place a disk or spacer which may be fixed or expandable—that is, spring-loaded, on rod 13 so that the walls 16 are constantly being pushed away from rod 13 and are being held tightly against inner walls of chamber 12.

In FIGURE 8, a top plan of the base plate 11, there are shown the walls 28 and 29. These walls are removable and act as perches for the birds and as a feed retaining means. Wall 28 is an inner feed retaining ring that circles around the entire bottom of element 12 while wall 29 is an outer retaining ring running similarly but at a short distance from ring 28. As can be seen in FIGURE 7, these retaining rings are in a stepped relationship. This is best seen perhaps in FIGURE 9 where the retaining rings 28 and 29 are shown reaching the same heights but retaining ring 28 extends down only to the flat surface or ridge 30 while the outer retaining ring 29 extends down a bit further to the lower ridge 31. Thus, the majority of seed which is lifted or scattered by the feeding birds from the highest section 26 of tray 11 will fall to the lower surface 30, and it will be more difficult for the feeding birds to scatter the feed from there. Further, the use of the steps in the bottom tray creates risers 42 and 43 in the tray against which the removable rings 28 and 29 press and are thereby held in position, the risers being seen in FIGURE 11, for example.

In FIGURE 4, a front elevation, a device is shown which is similar to that shown in FIGURE 1 but which contains a seed catcher 32 fixed to the tray 33. This catcher is a hollow member which is attached to the bottom 33 by clips 34. One form of clip or attachment 34 which may be used is seen in more detail in FIGURE 5 which is a bottom plain view of the device of FIGURE 4. There it will be seen that the bottom 33 is equipped with brackets 35 which receive tongues 36 that are contained on the top of the catcher 32. Thus, a bayonet fitting is made available, and by simple rotation of the seed catcher element 32 the tongues 36 will slide under and into locking relationship with their respective brackets 35, a direction of rotating to unlock the devices being shown by arrow 37. The given seed catcher 32 shown in FIGURE 4 is provided with a plurality of holes 38 which afford ventilation to the seed. This keeps the seed dry and in good shape for reuse. This is true in stormy weather unless there is a hard driving, highly slanted rain or snow fall.

It is well known that birds feeding on feeders scatter seeds around quite extensively and will pick out certain seeds in a mixture in preference to others. The feed that is coming from the central member 12 will normally be contained in the areas designated 39b in FIGURE 7—that is, in a volume defined by the inner retaining ring 28 and the outside walls of central member 12 and the adjacent top surface of bottom 11, this being the uppermost level 26. Most of the scattering will be done so that the seed will fall between inner ring 28 and outer ring 29. In order for the seed to be removed from that area to catcher 32, the bottom 33 of the modification of this device that is equipped with the seed catcher has in the bottom area 30 that extends between inner ring 28 and outer ring 29 a plurality of holes 40. Thus, seed which has been scattered from area 39b to the area 39a between the two retaining rings will fall through those holes into the seed catcher 32. This relationship can be seen in FIGURE 11 in which, for convenience, the seed catcher 32 is not shown to be perforated. Actually, it need not be perforated for the holes 40 provide substantial ventilation, but the perforated form is preferred.

If desired, drainage holes 41 can be provided as shown in FIGURES 8 and 10, in the bottom tray part, and these holes can also be used for hanging suet feeders. It is understood, of course, that the device of this invention is generally suspended or held above the ground, the top bearing a loop 13a for this purpose, and that such suet feeders would hang the suet below the device of this invention but above the ground at substantial distances. Further, the platforms that are shown in the bottom tray, such as platform 31 given in FIGURE 9, may be eliminated or made very small in order to discourage larger birds and thus attract smaller birds to the feeder. Another way of doing this is to shorten the height of the central portion 12 so that there is but little head room. In still another modification the seed catcher 32 is provided with openings having platforms located immediately at the bottom of the opening extending horizontally from the catcher so that the seed which is caught can fall out and onto the platform on which platform small birds may stand and feed.

The device of this invention has the advantage of being simple in design and being very easily separated. Thus, it can be disassembled and assembled quickly and cleaning is made easy. Further, it can be prepared of aluminum or similar long-lasting materials which can readily receive and keep over long time periods various kinds of age and weatherproof materials. The device has a large capacity for holding a variety of feeds, and the user can experiment with different kinds of feed and record which ones are the most effective in attracting birds. By using the seed-catching device, the user can determine what kinds of seeds in a mixture of bird seed is not being accepted at a given time of the year or in a given locality. Still further, the large birds can be excluded so that the number of birds of the smaller kind that are attracted can be increased.

Economy is provided, too, for there are several safeguards that decrease feed waste. The feed-type segregation that is accomplished by the compartmentation will allow one to use different feeds so that birds can feed on what they desire rather than flicking out seeds they do not want. Further, one can use only a feed that is effective in attracting birds, so that the waste of undesired feeds can be avoided. The inner feed control ring and outer waste control rings cooperate to eliminate or cut down severely the scattering of feed. Further, the use of the seed-catcher will allow one to catch most of the seed which is normally lost on conventional bird feeders by the falling to the ground of the scattered seed where it generally goes to waste or where the birds feeding on the ground are exposed to predators. Another advantage rests in the fact that the feed supply is protected against wind and weather conditions so that it is not blown or scattered or damaged by water. Thus, the feed is kept under good healthy conditions over long periods of time. Still another advantage rests in the fact that the top can be easily removed exposing the chamber 12 for reloading with feed and the user can carry or handle all the remaining elements about as a unit for they are firmly held in their respective positions by rod 13 and retainer 15 and the partition retainer disk. Finally, the entire assembly is readily constructed from inexpensive non-corrosive materials so that the cost of the device of this invention is easily recovered in the amount of bird seed that is saved by the user. In preferred devices aluminum is used and frequently when metal retainer rings 28 and 29 or other perches are used these are coated with a plastic or a non-metallic coating to prevent any possibility of wet birds freezing to the metal surfaces or such perches, as well as other parts, which coating may be constructed of plastics such as polyamides, polyethylene, polypropylene, polymethacrylate and the like.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. A feeder for feeding granulated materials, such as bird feed, comprising a top, a centrally disposed chamber and a bottom tray, said centrally disposed chamber being subdivided into a plurality of separate compartments by a plurality of walls each of which extends radially from the center of said chamber and contacts the inside wall of said chamber throughout its length and said wall of said chamber being in contact all along its bottom edge with said bottom of said feeder except at spaced intervals at which a portion of said wall is removed affording a passageway from the respective compartments for feed contained therein to fall by gravity to the said tray; and in said tray a feed retaining means comprising a plurality of at least three different substantially flat floor levels which are in a confined, stepped relationship with each other and are so confined by a pair of walls positioned on the top surface of the bottom of said tray and circling said chamber and spaced apart from each other, the outermost of said floors affording a perch.

2. A feeder in accordance with claim 1 in which the said radial walls are removable.

3. A feeder in accordance with claim 1 in which said pair of walls comprises removable rings.

4. A feeder in accordance with claim 1 in which said pair of walls comprises removable rings of different heights.

5. A feeder in accordance with claim 1 in which the said bottom has a plurality of holes in the said floor of said tray between said walls, said holes being large enough to permit seed scattered to this location to pass through said holes.

6. A feeder in accordance with claim 1 which has attached to and underneath the said tray a chamber for catching feed.

7. A feeder in accordance with claim 6 in which said catch chamber has perforations in its vertical walls.

8. A feeder in accordance with claim 1 in which the said central chamber is in the form and shape of a hollow truncated cone with its smaller base in the lower position.

9. A feeder in accordance with claim 1 in which the said top, central chamber and bottom are held together by a rod running centrally through said device and having a locking and holding means at its ends.

10. A feeder in accordance with claim 1 in which said top extends over and beyond the outermost edges of said bottom.

11. A feeder in accordance with claim 1 in which said centrally disposed chamber is made of a transparent material.

12. A feeder in accordance with claim 1 which contains non-metallic perches.

13. For feeding granulated materials, such as bird feed, a non-unitary feeder capable of being held together by the tightening of a single holding means which feeder comprises a top; a centrally disposed chamber having a plurality of cut-away portions at its bottom-most edge affording outlets for granulated material in said chamber; within said chamber a plurality of radially extending walls that divide said chamber into separate compartments each of which communicates with said bottom so that feed in it passes to said bottom through a respective outlet; a bottom that extends beyond the bottom edge of said central chamber, the said top affording a cover for said central chamber and said bottom, the said bottom affording a perch for birds feeding on said device and a tray to receive feed passing through a given compartment and the respective outlet in said chamber; in said bottom a plurality of at least three different substantially flat floor levels which are in a confined, stepped relationship with each other and which are so confined by an inner ring and an outer ring circling said central chamber and positioned on said bottom, each ring affording a wall for respective floor levels confining a given floor level from an adjacent different floor level; and in holding contact with the said top a stud having a length running through the entire said device and being threaded on its opposite ends to receive nuts to hold the said elements together as a unit.

14. A device in accordance with claim 13 in which the section of the said bottom between the said inner ring and the said chamber is higher than the section of said bottom lying between said rings.

15. A device in accordance with claim 13 in which the section of the said bottom extending beyond said outer ring is at a lower level than said section of said bottom lying between said rings.

16. A device in accordance with claim 14 which includes a feed catcher attached to said bottom.

17. A device in accordance with claim 16 in which said catcher is perforated.

18. A feeder in accordance with claim 13 in which said centrally disposed chamber is made of a transparent material.

19. A feeder in accordance with claim 13 which contains non-metallic perches.

References Cited by the Examiner

UNITED STATES PATENTS

| | | | |
|---|---|---|---|
| 954,968 | 4/1910 | Jocoy | 119—52 |
| 1,058,796 | 4/1913 | Schott | 119—52 |
| 1,144,157 | 6/1915 | Stroup | 119—52 |
| 1,286,002 | 11/1918 | Hoffman | 119—52 |
| 2,591,126 | 4/1952 | Breck | 119—52 |
| 2,786,446 | 3/1957 | Newman | 119—52 |

FOREIGN PATENTS

| | | |
|---|---|---|
| 499,617 | 1/1939 | Great Britain. |

SAMUEL KOREN, *Primary Examiner.*

HUGH R. CHAMBLEE, *Examiner.*